US012570517B2

(12) United States Patent
Kessler et al.

(10) Patent No.: US 12,570,517 B2
(45) **Date of Patent: *Mar. 10, 2026**

(54) APPARATUS AND METHOD FOR MONITORING FLUID OR MATERIAL TRANSFER INTO A RECEIVING TANK OR RECEPTACLE

(71) Applicants: William Kessler, Hopewell Junction, NY (US); Raymond Anthony Joao, Yonkers, NY (US)

(72) Inventors: William Kessler, Hopewell Junction, NY (US); Raymond Anthony Joao, Yonkers, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/892,401

(22) Filed: Sep. 22, 2024

(65) Prior Publication Data

US 2025/0011155 A1 Jan. 9, 2025

Related U.S. Application Data

(63) Continuation of application No. 18/114,232, filed on Feb. 25, 2023, now Pat. No. 12,195,321.

(Continued)

(51) Int. Cl.
*B67D 7/32* (2010.01)
*B67D 7/04* (2010.01)
(Continued)

(52) U.S. Cl.
CPC ............. *B67D 7/3281* (2013.01); *B67D 7/04* (2013.01); *B67D 7/3218* (2013.01);
(Continued)

(58) Field of Classification Search
CPC ...... B67D 7/3281; B67D 7/04; B67D 7/3218; B67D 7/3227; B67D 7/3209; B67D 2007/329; G08B 3/00; G08B 21/182
See application file for complete search history.

(56) References Cited

U.S. PATENT DOCUMENTS 4,459,584 A * 7/1984 Clarkson .............. G08B 21/182 73/321
4,757,305 A * 7/1988 Peso ........................ G01F 23/60 73/307

(Continued)

FOREIGN PATENT DOCUMENTS

WO WO-2022212797 A1 * 10/2022 ........... G01N 29/045

*Primary Examiner* — Nicolas A Arnett
(74) *Attorney, Agent, or Firm* — Raymond A. Joao, Esq.

(57) ABSTRACT

An apparatus, including a monitor system which includes a microphone, a first power supply, and a transmitter which transmits a first audible sound, indicative of a normal flow of fluid into a tank, or transmits a second audible sound, indicative of a need to cease a flow of the fluid into the tank; an attachment device to which the monitor system or the microphone is attached and which is attached to a ventilation pipe or an object in a vicinity of the ventilation pipe; and a receiver system which includes a receiver, which receives the first audible sound or the second audible sound, a second power supply, and a speaker which provides a first audio output, indicative of the first audible sound, or a second audio output indicative of the second audible sound. The speaker outputs the first audio output or outputs the second audio output.

20 Claims, 3 Drawing Sheets

Related U.S. Application Data

(60) Provisional application No. 63/326,824, filed on Apr. 2, 2022.

(51) Int. Cl.
*G08B 3/00* (2006.01)
*G08B 21/18* (2006.01)

(52) U.S. Cl.
CPC .......... *B67D 7/3227* (2013.01); *B67D 7/3209* (2013.01); *B67D 2007/329* (2013.01); *G08B 3/00* (2013.01); *G08B 21/182* (2013.01)

(56) References Cited

U.S. PATENT DOCUMENTS 5,251,482 A * 10/1993 Bates .................... G01F 17/00 73/290 V
5,886,249 A * 3/1999 Bonne .................... G01N 21/37 250/341.1
5,898,376 A * 4/1999 Webb .................. G01F 23/0015 340/623
6,766,837 B1 * 7/2004 Ruffa ....................... B67D 7/46 141/95
7,177,780 B2 * 2/2007 Hillam ................... G06Q 10/08 702/156
7,191,649 B1 * 3/2007 Coogle ................... G01F 23/74 73/313
8,959,774 B2 * 2/2015 Cajiga ..................... B23P 11/00 29/897.3
10,152,877 B2 * 12/2018 Linder ..................... G08B 1/08
11,111,130 B2 * 9/2021 Bevins ..................... B67D 7/32
12,195,321 B2 * 1/2025 Kessler ................ B67D 7/3281
2002/0167587 A1 * 11/2002 Ogasawara ............ H04N 7/183 348/E7.087
2004/0145465 A1 * 7/2004 Stults ..................... G08B 19/00 340/521
2016/0039656 A1 * 2/2016 Walsh ...................... B67D 7/86 700/283
2016/0255429 A1 * 9/2016 Dickson .............. G01F 23/0015 381/79

* cited by examiner

APPARATUS AND METHOD FOR MONITORING FLUID OR MATERIAL TRANSFER INTO A RECEIVING TANK OR RECEPTACLE

RELATED APPLICATIONS

This application is a continuation application of U.S. patent application Ser. No. 18/114,232, filed Feb. 25, 2023, and entitled "APPARATUS AND METHOD FOR MONITORING FLUID OR MATERIAL TRANSFER INTO A RECEIVING TANK OR RECEPTACLE", the subject matter and teachings of which are hereby incorporated by reference herein in their entirety. U.S. patent application Ser. No. 18/114,232 claims the benefit of the priority of U.S. Provisional Patent Application Ser. No. 63/326,824, filed Apr. 2, 2022, and entitled "APPARATUS AND METHOD FOR MONITORING FLUID OR MATERIAL TRANSFER INTO A RECEIVING TANK OR RECEPTACLE", the subject matter and teachings of which are hereby incorporated by reference herein in their entirety.

FIELD OF THE INVENTION

The present invention pertains to an apparatus and method for monitoring fluid or material transfer into a receiving tank or receptacle and, in particular, to an apparatus and method for monitoring fluid or material transfer into a receiving tank or receptacle which can provide information indicative of a safe or proper transfer or delivery or information indicative of an unsafe or improper transfer or delivery.

BACKGROUND OF THE INVENTION

Fluid transfer from one storage tank or entity to and into another storage tank or entity is commonplace and oftentimes can involve the transfer and/or storage of hazardous fluids or substances. Due to the nature of the fluids or substances being transferred and/or stored, vents, vent pipes, or ventilation systems, are typically required to allow venting from the storage tank or entity into the atmosphere. While a respective vent, vent pipe, or ventilation system, serves crucial safety and/or operational functions, the same can also be a conduit for an overflow or other exiting of the very fluids or substances stored in the respective storage tank or entity. As a result, great care must be taken in monitoring the flow of any hazardous fluid or substance when introducing the same into a respective storage tank or entity.

One well-known example situation, in which care must be taken in introducing, or filling, hazardous fluids or substances into a respective storage tank or entity, is the delivery of heating oil to a residential premises or building or to a commercial premises or building and, in particular, in filling or re-filling the respective heating oil tank(s) situated at the respective residential premises or building or commercial premises or building.

Heating oil tanks typically have several components, including, but not limited to, a fill pipe, into which the heating oil is introduced into the heating oil tank from an oil delivery truck or other oil storage tank, the tank itself for storing the delivered heating oil, oil lines to the furnace, boiler, hot water heater, or other systems, devices, or equipment, located at the respective residential premises or building or commercial premises or building, and a vent pipe. The vent pipe serves important functions such as relieving any vacuum created when the oil is pulled from the heating oil tank, allows appropriate ventilation to the outside environment, and makes a noise indicative of the safe and proper flow of the heating oil into the heating oil tank. Typically, oil delivery professionals can monitor the proper and safe flow of heating oil into the heating oil tank by listening to the sound emanating from the vent pipe.

When vent pipes are located or positioned next to, or near to, or in close proximity to, fill pipes, the oil delivery professional can easily monitor the sound emanating from the vent pipe and safely deliver heating oil into the heating oil tank. When vent pipes are not located or not positioned next to, or near to, or in close proximity to, fill pipes, the oil delivery professional faces the problem of having to go to back and forth between the fill tank and the vent pipe. This can prove problematic if a problem is detected at the vent pipe and heating oil spills or overflows before the oil delivery professional can shut down the flow of heating oil at the oil delivery truck or at the nozzle.

While vent alarms have been devised to amplify the sounds emanating from the vent pipe, these vent alarms are prone to malfunction, dead batteries, contamination, clogging, and other hazards of being situated outdoors. In this regard, it is submitted that vent alarms cannot always be relied upon to work or to work properly. This can be the case when vent pipes are located next to as well as remote from fill pipes.

In view of the foregoing, there are numerous problems that exist in the delivery or transfer and/or storage of home heating oil, as well as other hazardous fluids or substances, which require technological solutions and improvements to existing technology.

SUMMARY OF THE INVENTION

The present invention pertains to an apparatus and method for monitoring fluid or material transfer into a receiving tank or receptacle and, in particular, to an apparatus and method for monitoring fluid or material transfer into a receiving tank or receptacle which can provide information indicative of a safe or proper transfer or delivery or information indicative of an unsafe or improper transfer or delivery, which overcomes the shortfalls of the prior art.

The present invention can be utilized for monitoring the delivery or transfer of any fluid, material, or substance, from one storage tank or receptacle to another storage tank or receptacle. The present invention can be utilized in the delivery or transfer of any fluid, material, or substance, or any hazardous fluid, material, substance, or any flammable fluid, material, or substance, or any dangerous fluid, material, or any fluid, material, or substance, of any kind, type, or nature. The present invention can also provide for the safe and secure, and/or spill-free or overflow-free, delivery or transfer of any fluid, material, or substance, of any kind, type, or nature.

The present invention can be utilized in order to deliver or to transfer any type or kind of fluid, material, or substance, whether liquid, solid, or gaseous, from one storage tank or receptacle to another storage tank or receptacle in a safe, secure, and/or efficient manner.

The present invention includes a monitor system, which includes a microphone, a power source or power supply, such as a battery or other direct current power source, or a suitable alternating current power source, depending upon the application, which provides electrical power to the monitor system, and a transmitter which transmits at least two audible sounds. The audible sounds include a first audible sound which is indicative of a normal flow of a fluid, substance, or material, into a tank during a delivery, transfer, filling, or refilling, operation and includes a second audible sound which is indicative of a need to cease the flow of the fluid, substance, or material, into the tank or receptacle.

The present invention also includes an attachment device which can be, or which can include, a magnet or securing element. The magnet can be any type or kind of magnet for securing the monitor system or microphone to or at a ventilation pipe, and the securing element can be any type or kind of strap, clamp, or other suitable device, for securing the monitor system or microphone to or at a ventilation pipe. For example, and without limitation, the attachment device or securing element can be a belt or a belt strap of any material(s), kind, or type, and/or can be a strap having hook and hoop ("Velcro®") fastening means or any other fastening means. In a preferred embodiment, the monitor system or the microphone is attached to the attachment device, and the attachment device is attached to a ventilation pipe associated with the fuel tank, or is attached to an object in a vicinity of the ventilation pipe.

The present invention also includes a receiver system, which can be a headset, an earpiece, a wearable device, or a handheld device. The receiver system includes a suitable housing, a receiver, which receives the at least two audible sounds, a power source or power supply, such as a battery or other direct current power source, or a suitable alternating current power source, depending upon the application, which provides electrical power to the receiver system, and a speaker, wherein speaker provides a first audio output indicative of the first audible sound or provides a second audio output indicative of the second audible sound. The speaker outputs the first audio output indicative of the normal flow of the fluid into the tank during the refilling operation and/or outputs the second audible sound indicative of the need to cease the flow of the fluid, material, or substance, into the tank.

The monitor system can include any components or devices needed or required for performing any and/or all of the functions and/or functionalities described herein as being performed by, or as being capable of being performed by, the monitor system. The monitor system includes a microphone which can be any suitable microphone or microphone system which can detect the various sounds which are described herein as being generated or produced during a delivery or transfer of any fluid, material, or substance, from one storage tank or receptacle to another storage tank or receptacle.

The monitor system also includes a power source or power supply which provides electrical power to the monitor system and/or any components of the same. The power supply can be any battery or other direct current ("DC") power source, or can be any suitable alternating current ("AC") power source, and/or can be or include any combination of a DC power source and an AC power source, depending upon the application. The power supply provides electrical power to the monitor system and/or to any of the components thereof.

The monitor system also includes a transmitter which can transmit signals of, or relating to, or corresponding to, at least two audible sounds which are or which can be detected by the microphone. The audible sounds which are or which can be detected by the microphone can include a first audible sound, which is indicative of a normal flow of a fluid, substance, or material, into a tank during a delivery, transfer, filling, or refilling, operation, and can include a second audible sound, which is indicative of a need to cease the flow of the fluid, substance, or material, into the tank or receptacle. The transmitter can transmit signals of, or relating to, or corresponding to, the audible sounds which are or which can be detected by the microphone.

Any suitable device, which can detect and transmit sounds can be utilized as the monitor system. Any suitable and commercially available transmitter unit of a baby monitor system or of an intercom system, or any component or components of the same, can also be utilized as, or as a component of, the monitor system.

The attachment device, can be, or can include, a magnet, a strap, a clamp, a belt, a strap having Velcro® securing elements, or any combination of the same, for securing the monitor system to, or in the vicinity of, a ventilation pipe. The attachment device can be any suitable magnet, strap, clamp, belt, strap having Velcro® securing elements, or any combination of the same, or any other suitable device, for securing the monitor system to, or in the vicinity of, a ventilation pipe. The attachment device 20 can also be, or can include, a belt or a belt strap manufactured of any suitable material(s) and/or having a hook and hoop ("Velcro®") fastening means or having any other fastening means or elements.

The receiver system can be, or can include, a headset, an earpiece, an ear bud, an earpiece assembly, or an other wearable device or handheld device. The receiver system can also be, or can include, a cellular telephone, a Smartphone, or a smart phone. The receiver system includes a suitable housing, which can be a headset housing, a earpiece housing, a cellular telephone case, a Smartphone case, or a smart phone case, or any other suitable handheld device or wearable device housing or case.

The receiver system also includes a receiver, which receives the signals of, or relating to, or corresponding to, the audible sounds which are or which can be detected by the microphone and transmitted from the transmitter of the monitor system. The receiver can be any suitable receiver for receiving the signals which are transmitted from the transmitter of the monitor system. Any suitable and commercially available receiver unit of a baby monitor system or of an intercom system, or any component or components of the same, can also be utilized as, or as a component of, the receiver or the receiver system.

The receiver system also includes a power source or power supply which provides electrical power to the receiver system and/or any components of the same. The power supply can be any battery or other direct current ("DC") power source, or can be any suitable alternating current ("AC") power source, and/or can be or include any combination of a DC power source and an AC power source, depending upon the application. The power supply provides electrical power to the receiver system and/or to any of the components thereof.

The receiver system also includes a speaker, which provides audio outputs of the sounds detected by the microphone of the monitor system, including, but not limited to, the first audio output which is indicative of the first audible sound detected by the microphone of the monitor system, and the second audio output which is indicative of the second audible sound detected by the microphone of the monitor system. The speaker outputs the sound or sounds detected by the microphone and transmitted from the transmitter. The speaker can output a first audio output, which is indicative of the normal flow of the fluid, material, or substance, into the respective tank or receptacle during the delivery, transfer, filling, or refilling, operation, and the speaker can output a second audible sound, which is indicative of the need to cease the flow or transfer or the respective fluid, material, or substance, to and into the respective tank or receptacle.

The receiver system can also include an input device which can be or can include any number of buttons, a keypad, or a touch screen keypad or keyboard for entering information or commands into the receiver system. The receiver system can also include a computer which can perform and any number or processing routines for controlling the operation of the receiver system.

The receiver system can also include a display for displaying information to the user or oil delivery professional using the apparatus of the present invention. The display can provide a visual display or a visual representation of the sound or sounds detected at, and transmitted from the transmitter of, the monitor system. The receiver system can also include one or more indicator lights, which can be utilized in order to provide a visual indication of, and during, the respective delivery, transfer, filling, or refilling, operation. For example, the indicator lights can include a green light bulb, or other suitable color light bulb, which can be illuminated to be indicative of the first audio output, which first audio output is indicative of the normal flow of the fluid, material, or substance, into the respective tank or receptacle during the delivery, transfer, filling, or refilling, operation. The indicator lights can also include a red light bulb, or other suitable color light bulb, which can be illuminated to be indicative of the second audible sound, which second audible sound is indicative of the need to cease the flow or transfer or the respective fluid, material, or substance, to and into the respective tank or receptacle.

The receiver system can also include a transmitter which can transmit a control signal(s) to activate an emergency shut-off valve which can be utilized in connection with, or which is associated with, or which can be a component of, the nozzle which is used in dispensing the respective fluid, material, or substance, in and during the respective delivery, transfer, filling, or refilling, operation. The emergency shut-off valve can be controlled electronically via an electronic control unit. The transmitter can transmit an appropriate control signal to shut off, or to close, the emergency shut-off valve, and/or can transmit an appropriate control signal to turn on, or to open, the emergency shut-off valve.

As noted herein, any suitable and commercially available receiver unit of a baby monitor system or of an intercom system, or any component or components of the same, can also be utilized as, or as a component of, the receiver or the receiver system.

The present invention can also include an emergency shut-off valve which can be utilized in connection with, which can be associated with, or which can be a component of, the nozzle which is used in dispensing the respective fluid, material, or substance, in and during the respective delivery, transfer, filling, or refilling, operation. In a preferred embodiment, the present invention can also, but need not, include the nozzle.

The apparatus of the present invention can be utilized in order to perform and/or to ensure a safe and/or trouble-free delivery or transfer of any fluid, material, or substance, from one storage tank or receptacle to another storage tank or receptacle. The apparatus and method of the present invention can be utilized in order to deliver or transfer any type or kind of fluid, material, or substance, from one storage tank or receptacle to another storage tank or receptacle.

The present invention can be utilized in order to effectuate the delivery of any type or kind of fluid, material, or substance. In one such example use, the monitor system can be attached, at or near the top or topmost portion of a ventilation pipe of the tank into which the fluid, material, or substance, is being delivered or transferred. The monitor system is attached to the attachment device, and the attachment device is attached to the ventilation pipe. The monitor system and, in particular, the microphone, should be positioned at the top of the ventilation pipe so that the microphone can detect the sounds emanating from, or produced at or by, the ventilation pipe during the delivery or transfer of the fluid, material, or substance, into the respective tank. Once the nozzle has been connected to and/or secured to the fill pipe of the tank into which the fluid, material, or substance, is to be delivered or transferred, and once the monitor system has been properly positioned and secured at the top of the ventilation pipe, the apparatus and method of the present invention can be utilized to as to effectuate and so as to ensure the safe and trouble-free delivery or transfer of fluid, material, or substance, into the tank.

The apparatus and method the present invention can be utilized in one example use embodiment or scenario in a following manner. With the components of the apparatus situated and deployed as described above, the delivery or transfer of a fluid, material, or substance, from the nozzle of a delivery vehicle or delivery source and into a tank can commence. Thereafter, the microphone of the monitor system will detect the sound which emanates from the ventilation pipe of the tank, and the transmitter of the monitor system will transmit a signal(s), which is/are indicative of the sound(s) emanating from the ventilation pipe, to the receiver of the receiver system. The speaker of the receiver system will provide an audible output of the sound(s) emanating from the ventilation pipe during the delivery or transfer of the fluid, material, or substance, into the tank.

During the above described operation, at least three different kinds of sounds or sound conditions could emanate from the ventilation pipe. A first sound, which may be a hissing sound or a whistling sound, or other sound, indicative a flow of the fluid, material, or substance, into the tank can be detected by the microphone, transmitted from the transmitter, received by the receiver, and heard via the speaker, can indicate a safe and trouble-free delivery or transfer operation of and involving the fluid, material, or substance.

A second sound, which may be a loud, a screeching, or an abrupt or violent, sound, indicative of an overfill condition, a clogged condition, or other problematic or trouble-some condition can also be detected by the microphone, transmitted from the transmitter, received by the receiver, and heard via the speaker, and can indicate an unsafe, problematic, or troublesome, condition, requiring the immediate cessation, or ceasing, or discontinuance, of the delivery or transfer operation of and regarding the fluid, material, or substance.

A third sound, or a non-sound, may be the absence of any sound, which can indicate that either no fluid, material, or substance is being delivered or transferred into the tank or that no tank is present, which might be the case if a removal of the tank was unknown to, or never reported to, the delivery professional.

The display of the receiver system can also display a digital or visual representation of the amplitude and/or any other nature or representation of the sound(s) which are detected by the microphone, transmitted from the transmitter, received by the receiver, and heard, or which should be heard, via the speaker. In this regard, a visual representation of the sound(s) detected by the microphone can be provided to the delivery professional. A respective green, or other suitable color, indicator light can be illuminated so as to be indicative of a normal flow of the fluid, material, or substance, to and into the tank, and/or the respective red, or other suitable color, indicator light can be illuminated so as to be indicative of an unsafe condition, a problem condition, an overfill condition, a clogged condition, or other problematic or trouble-some condition, and/or the absence of a tank condition.

Depending upon the sound or lack of sound detected by the microphone, transmitted from the transmitter, received by the receiver, and heard via the speaker, the delivery professional can either continue the safe and trouble-free delivery or transfer of the fluid, material, or substance, to and into the tank or can shut down the flow of the fluid, material, or substance at and from the nozzle of the delivery vehicle or delivery source. If the sound detected by the microphone and output via the speaker indicates a normal delivery or transfer operation, then the delivery professional can proceed to complete the delivery or transfer operation, all the while monitoring the sound(s) emanating from the ventilation pipe.

If, however, the delivery professional hears a sound(s), or sees a representation(s) of a sound(s) indicative of an unsafe condition, a problem condition, an overfill condition, a clogged condition, or other problematic or trouble-some condition, and/or the absence of a tank condition, then the delivery professional can manually shut off the nozzle so as to investigate the detected problem or condition. The delivery professional can also enter an instruction into the receiver system and/or can transmit a valve nozzle shut-off signal from the receiver system to the emergency shut-off valve, which is being utilized in connection with, or which is associated with, or which is a component of, the nozzle, so as to shut off the flow of the fluid, material, or substance, from the nozzle.

Thereafter, the delivery professional can complete the delivery or transfer of the fluid, material, or substance, if no problem is detected, or can investigate any detected problem with the delivery or transfer operation having been shut off or with the nozzle having shut off, or can terminate the delivery or transfer operation.

The present invention provides a technological solution for, and provides a technological improvement to and for, delivery or transfer systems which are used in delivering or transferring fluids, materials, or substances, of any type or kind, from one storage tank or receptacle to another, by monitoring the sound or sounds which emanate from the ventilation pipe(s) of or corresponding to the storage tank or receptacle to or into which a respective fluid, material, or substance, is being delivered or transferred. As noted herein, the present invention can be utilized in and for the transfer of any fluids, materials, or substances, whether in solid, liquid, or gaseous, form, and/or of any type, kind, or nature.

BRIEF DESCRIPTION OF THE DRAWINGS

In the Drawings:

FIG. 2 illustrates a preferred embodiment deployment of the components of the apparatus of FIG. 1 in a delivery of heating oil into a heating oil tank of.

DESCRIPTION OF THE PREFERRED EMBODIMENTS

Figure 1:
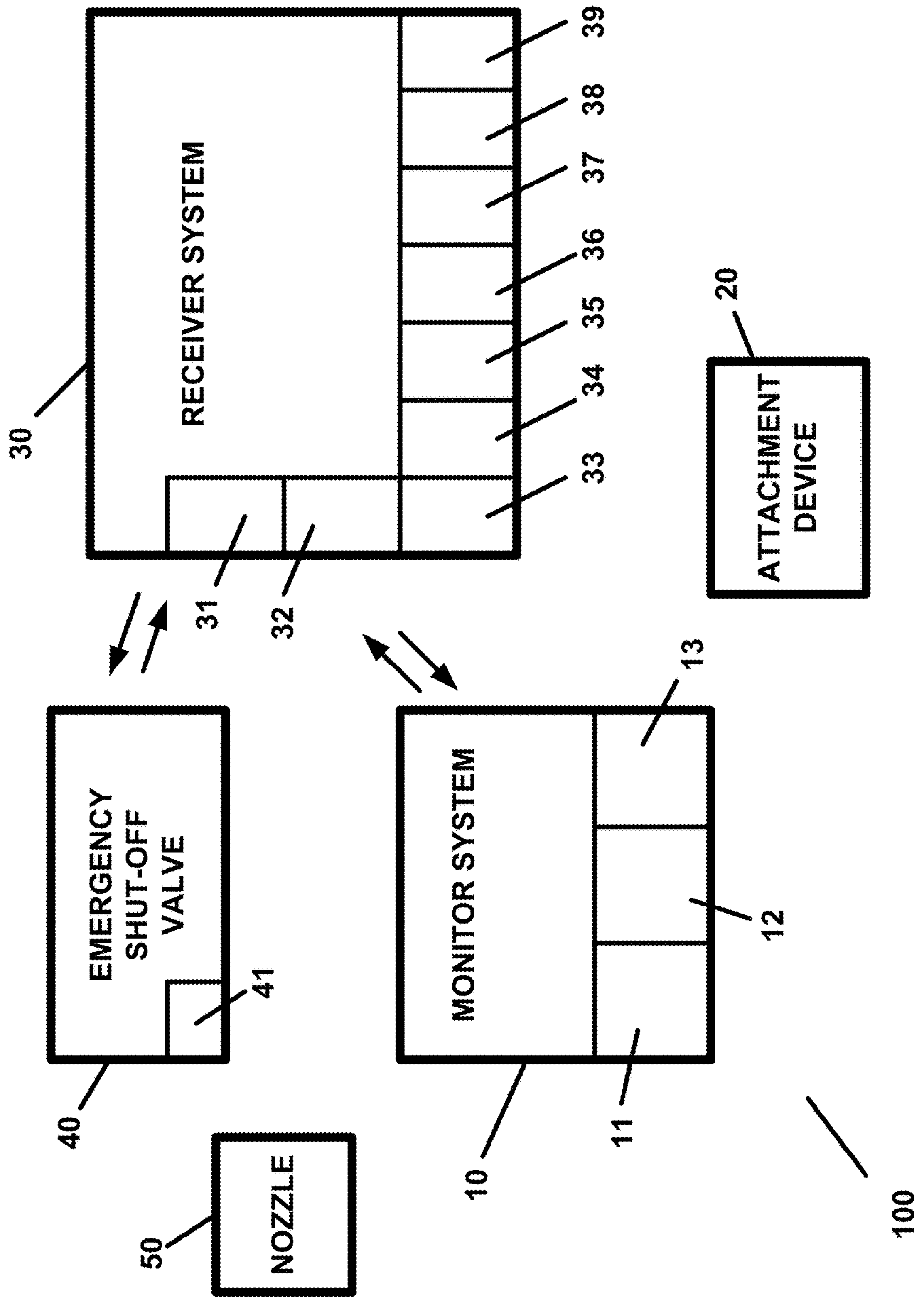
FIG. 1 illustrates a preferred embodiment of the apparatus of the present invention, in block diagram form.

The present invention pertains to an apparatus and method for monitoring fluid or material transfer into a receiving tank or receptacle and, in particular, to an apparatus and method for monitoring fluid or material transfer into a receiving tank or receptacle which can provide information indicative of a safe or proper transfer or delivery or information indicative of an unsafe or improper transfer or delivery.

The apparatus and method of the present invention can be utilized for monitoring the delivery or transfer of any fluid, material, or substance, from one storage tank or receptacle to another storage tank or receptacle. The apparatus and method of the present invention can be utilized in the delivery or transfer of any fluid, material, or substance, or any hazardous fluid, material, substance, or any flammable fluid, material, or substance, or any dangerous fluid, material, or any fluid, material, or substance, of any kind, type, or nature. The apparatus and method of the present invention can also provide for the safe and secure, and/or spill-free or overflow-free, delivery or transfer of any fluid, material, or substance, of any kind, type, or nature.

In a preferred embodiment, the apparatus and method of the present invention includes a monitor system, which includes a microphone, a power source or power supply, such as a battery or other direct current power source, or a suitable alternating current power source, depending upon the application, which provides electrical power to the monitor system, and a transmitter which transmits at least two audible sounds. The audible sounds include a first audible sound which is indicative of a normal flow of a fluid, substance, or material, into a tank during a delivery, transfer, filling, or refilling, operation and includes a second audible sound which is indicative of a need to cease the flow of the fluid, substance, or material, into the tank or receptacle.

The apparatus of the present invention also includes an attachment device which can be, or which can include, a magnet or securing element. The magnet can be any type or kind of magnet for securing the monitor system or microphone to or at a ventilation pipe, and the securing element can be any type or kind of strap, clamp, or other suitable device, for securing the monitor system or microphone to or at a ventilation pipe. For example, and without limitation, the attachment device or securing element can be a belt or a belt strap of any material(s), kind, or type, and/or can be a strap having hook and hoop ("Velcro®") fastening means or any other fastening means. In a preferred embodiment, the monitor system or the microphone is attached to the attachment device, and the attachment device is attached to a ventilation pipe associated with the fuel tank, or is attached to an object in a vicinity of the ventilation pipe.

In a preferred embodiment, the apparatus and method of the present invention also includes a receiver system, which can be a headset, an earpiece assembly, or an other wearable device or handheld device. In a preferred embodiment, the receiver system includes a suitable housing, a receiver, which receives the at least two audible sounds, a power source or power supply, such as a battery or other direct current power source, or a suitable alternating current power source, depending upon the application, which provides electrical power to the receiver system, and a speaker, wherein speaker provides a first audio output indicative of the first audible sound or provides a second audio output indicative of the second audible sound. In a preferred embodiment, the speaker outputs the first audio output indicative of the normal flow of the fluid into the tank during the refilling operation and/or outputs the second audible sound indicative of the need to cease the flow of the fluid, material, or substance, into the tank.

Applicant hereby incorporates by reference herein the subject matter and teachings of U.S. Provisional Patent Application Ser. No. 63/326,824, filed Apr. 2, 2022, and entitled "APPARATUS AND METHOD FOR MONITORING FLUID OR MATERIAL TRANSFER INTO A RECEIVING TANK OR RECEPTACLE", the subject matter and teachings of which are hereby incorporated by reference herein in their entirety.

Applicant hereby incorporates by reference herein the subject matter and teachings of U.S. patent application Ser. No. 18/114,232, filed Feb. 25, 2023, and entitled "APPARATUS AND METHOD FOR MONITORING FLUID OR MATERIAL TRANSFER INTO A RECEIVING TANK OR RECEPTACLE", the subject matter and teachings of which are hereby incorporated by reference herein in their entirety.

FIG. 1 illustrates a preferred embodiment of the apparatus of the present invention, which is designated generally by the reference numeral 100, in block diagram form. With reference to FIG. 1, the apparatus 100 includes a monitor system 10. In a preferred embodiment, the monitor system 10 can include any components or devices needed or required for performing any and/or all of the functions and/or functionalities described herein as being performed by, or as being capable of being performed by, the monitor system 10.

In a preferred embodiment, and with reference once again to FIG. 1, the monitor system 10 includes a microphone 11 which can be any suitable microphone or microphone system which can detect the various sounds which are described herein as being generated or produced during a delivery or transfer of any fluid, material, or substance, from one storage tank or receptacle to another storage tank or receptacle.

With reference once again to FIG. 1, the monitor system 10 also includes a power source or power supply 12 (hereinafter "power supply 12"). In a preferred embodiment, the power supply 12 provides electrical power to the monitor system 10 and/or any components of the same. In a preferred embodiment, the power supply 12 can be any battery or other direct current ("DC") power source, or can be any suitable alternating current ("AC") power source, and/or can be or include any combination of a DC power source and an AC power source, depending upon the application. In a preferred embodiment, the power supply 12 provides electrical power to the monitor system and/or to any of the components thereof.

With reference once again to FIG. 1, the monitor system 10 also includes a transmitter 13 which can transmit signals of, or relating to, or corresponding to, at least two audible sounds which are or which can be detected by the microphone 11. In a preferred embodiment, the audible sounds which are or which can be detected by the microphone 11 can include a first audible sound, which is indicative of a normal flow of a fluid, substance, or material, into a tank during a delivery, transfer, filling, or refilling, operation, and can include a second audible sound, which is indicative of a need to cease the flow of the fluid, substance, or material, into the tank or receptacle. In a preferred embodiment, the transmitter 13 can transmit signals of, or relating to, or corresponding to, the audible sounds which are or which can be detected by the microphone 11.

In a preferred embodiment, any suitable device, which can detect and transmit sounds can be utilized as the monitor system 10. In a preferred embodiment, any suitable and commercially available transmitter unit of a baby monitor system or of an intercom system, or any component or components of the same, can also be utilized as, or as a component of, the monitor system 10.

With reference once again the FIG. 1, the apparatus 100 also includes an attachment device 20, which can be, or which can include, a magnet, a strap, a clamp, a belt, a strap having Velcro® securing elements, or any combination of the same, for securing the monitor system 10 to, or in the vicinity of, a ventilation pipe (not shown). In a preferred embodiment, the attachment device 20 can be any suitable magnet, strap, clamp, belt, strap having Velcro® securing elements, or any combination of the same, or any other suitable device, for securing the monitor system 10 to, or in the vicinity of, a ventilation pipe (not shown). In a preferred embodiment, the attachment device 20 can also be, or can include, a belt or a belt strap manufactured of any suitable material(s) and/or having a hook and hoop ("Velcro®") fastening means or having any other fastening means or elements.

With reference once again to FIG. 1, the apparatus 100 also includes a receiver system 30. In a preferred embodiment, the receiver system 30 can be, or can include, a headset, an earpiece, an ear bud, an earpiece assembly, or an other wearable device or handheld device. In a preferred embodiment, the receiver system 30 can also be, or can include, a cellular telephone, a Smartphone, or a smart phone. In a preferred embodiment, the receiver system 30 includes a suitable housing 31, which can be a headset housing, a earpiece housing, a cellular telephone case, a Smartphone case, or a smart phone case, or any other suitable handheld device or wearable device housing or case.

In a preferred embodiment, the receiver system 30 also includes a receiver 32, which receives the signals of, or relating to, or corresponding to, the audible sounds which are or which can be detected by the microphone 11 and transmitted from the transmitter 13 of the monitor system 10. In a preferred embodiment, the receiver 32 can be any suitable receiver for receiving the signals which are transmitted from the transmitter 13 of the monitor system 10. In a preferred embodiment, any suitable and commercially available receiver unit of a baby monitor system or of an intercom system, or any component or components of the same, can also be utilized as, or as a component of, the receiver 32 or the receiver system 30.

With reference once again to FIG. 1, the receiver system 30 also includes a power source or power supply 33 (hereinafter "power supply 33"). In a preferred embodiment, the power supply 33 provides electrical power to the receiver system 30 and/or any components of the same. In a preferred embodiment, the power supply 33 can be any battery or other direct current ("DC") power source, or can be any suitable alternating current ("AC") power source, and/or can be or include any combination of a DC power source and an AC power source, depending upon the application. In a preferred embodiment, the power supply 33 provides electrical power to the receiver system 30 and/or to any of the components thereof.

With reference once again to FIG. 1, the receiver system 30 also includes a speaker 34. In a preferred embodiment, the speaker 34 provides audio outputs of the sounds detected by the microphone 11 of the monitor system 10, including, but not limited to, the first audio output which is indicative of the first audible sound detected by the microphone 11 of the monitor system 10, and the second audio output which is indicative of the second audible sound detected by the microphone 11 of the monitor system 10. In a preferred embodiment, the speaker 34 outputs the sound or sounds detected by the microphone 11 and transmitted from the transmitter 13. In a preferred embodiment, the speaker 34 can output a first audio output, which is indicative of the normal flow of the fluid, material, or substance, into the respective tank or receptacle during the delivery, transfer, filling, or refilling, operation, and the speaker 34 can output a second audible sound, which is indicative of the need to cease the flow or transfer or the respective fluid, material, or substance, to and into the respective tank or receptacle.

With reference once again to FIG. 1, the receiver system 30 also includes an input device 35 which can be or can include any number of buttons, a keypad, or a touch screen keypad or keyboard for entering information or commands into the receiver system. In a preferred embodiment, the receiver system 30 can also include a computer 36 which can perform and any number or processing routines for controlling the operation of the receiver system 30.

In a preferred embodiment, the receiver system 30 can also include a display 37 for displaying information to the user or oil delivery professional using the apparatus 100 of the present invention. In a preferred embodiment, the display can provide a visual display or a visual representation of the sound or sounds detected at, and transmitted from the transmitter 13 of, the monitor system 10. In a preferred embodiment, the receiver system 30 can also include one or more indicator lights 38, which can be utilized in order to provide a visual indication of, and during, the respective delivery, transfer, filling, or refilling, operation. In a preferred embodiment, for example, the indicator lights 38 can include a green light bulb, or other suitable color light bulb, which can be illuminated to be indicative of the first audio output, which first audio output is indicative of the normal flow of the fluid, material, or substance, into the respective tank or receptacle during the delivery, transfer, filling, or refilling, operation. In a preferred embodiment, the indicator lights 38 can also include a red light bulb, or other suitable color light bulb, which can be illuminated to be indicative of the second audible sound, which second audible sound is indicative of the need to cease the flow or transfer or the respective fluid, material, or substance, to and into the respective tank or receptacle.

In a preferred embodiment, the receiver system 30 can also include a transmitter 39 which can transmit a control signal(s) to activate an emergency shut-off valve 40, which can be utilized in connection with, or which is associated with, or which is or can be a component of, the nozzle 50 which is used in dispensing the respective fluid, material, or substance, in and during the respective delivery, transfer, filling, or refilling, operation. In a preferred embodiment, the emergency shut-off valve is controlled electronically via an electronic control unit 41. In a preferred embodiment, the transmitter 39 can transmit an appropriate control signal to shut off, or to close, the emergency shut-off valve 40, and/or can transmit an appropriate control signal to turn on, or to open, the emergency shut-off valve 40.

As noted herein, in a preferred embodiment, any suitable and commercially available receiver unit of a baby monitor system or of an intercom system, or any component or components of the same, can also be utilized as, or as a component of, the receiver 32 or the receiver system 30.

In a preferred embodiment, the apparatus 100 can also include an emergency shut-off valve 40 which can be utilized in connection with, which can be associated with, or which can be a component of, the nozzle 50 which is used in dispensing the respective fluid, material, or substance, in and during the respective delivery, transfer, filling, or refilling, operation. In a preferred embodiment, the apparatus 100 can also, but need not, include the nozzle 50.

The apparatus 100 can be utilized in order to perform and/or to ensure a safe and/or trouble-free delivery or transfer of any fluid, material, or substance, from one storage tank or receptacle to another storage tank or receptacle. In a preferred embodiment, the apparatus 100 and method of the present invention will be described and illustrated as being used in the delivery of heating oil into a heating oil tank located a residential or commercial premises or building. Notwithstanding the heating oil example, it is important to note that the apparatus 100 and method of the present invention can also be utilized in order to deliver or transfer any type or kind of fluid, material, or substance, from one storage tank or receptacle to another storage tank or receptacle.

Figure 2:
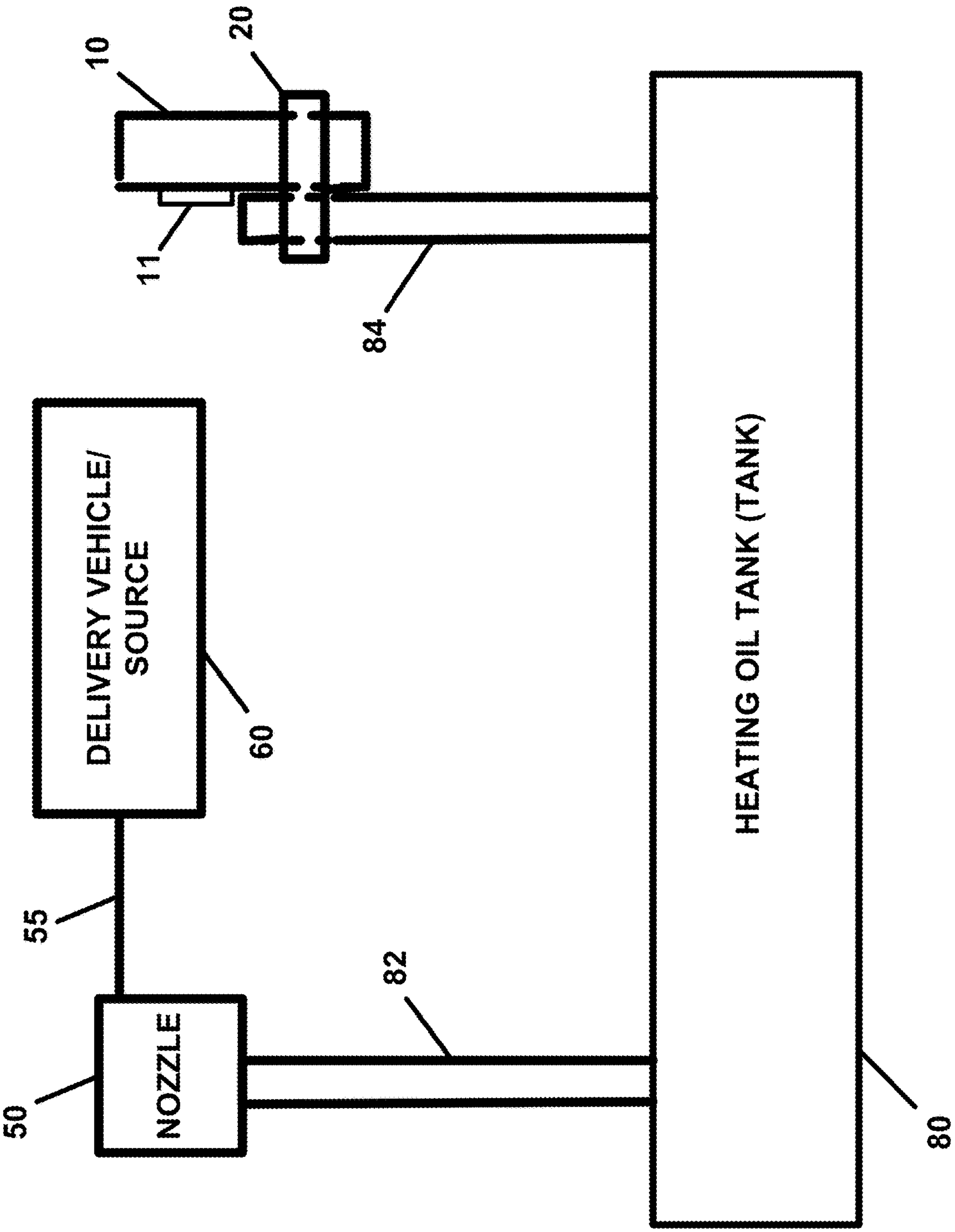

FIG. 2 illustrates a preferred embodiment deployment of the components of the apparatus 100 of the present invention in the delivery of heating oil into a heating oil tank of, associated with, or located at, a residential building or premises. With reference to FIG. 2, a heating oil tank 80 is shown which stores heating oil for use at the residential building or premises. With reference once again to FIG. 2, a fill pipe 82 is shown which extends from the heating oil tank 80. The delivery or transfer of heating oil into tank 80 is effectuated by and via the fill pipe 82. In this regard, when a heating oil delivery is effectuated, a respective nozzle 50 of the oil delivery vehicle 60 is connected to and/or secured to the fill pipe 82 of the heating oil tank 80 in order to effectuate the delivery or the transfer of the heating oil from the heating oil storage tank of the delivery vehicle 60 to and into the heating oil tank 80. In the preferred embodiment, the nozzle 50 is connected to the oil delivery vehicle 60 and the contents of the storage tank of the same via any appropriate and/or suitable delivery hose 55.

With reference once again to FIG. 2, a ventilation pipe 84 (also referred to herein as “vent pipe 84”) extends from the heating oil tank 80 and into the external environment. As shown in FIG. 2, the monitor system 10 is or can be attached, near or at the top or topmost portion of the ventilation pipe 84. In a preferred embodiment, the monitor system 10 is attached to the attachment device 20, and the attachment device 20 is attached to the ventilation pipe 84. In a preferred embodiment, the monitor system 10 and, in particular, the microphone 11, should be positioned at the top of the ventilation pipe 84 so that the microphone can detect the sounds emanating from, or produced at or by, the ventilation pipe 84 during the delivery or transfer of the heating oil into the heating oil tank 80. Once the nozzle 50 has been connected to and/or secured to the fill pipe 82, and once the monitor system 10 has been properly positioned and secured at the top of the ventilation pipe 84, the apparatus 100 and method of the present invention can be utilized to as to effectuate and so as to ensure the safe and trouble-free delivery or transfer of the heating oil into the heating oil tank 80.

Figure 3:
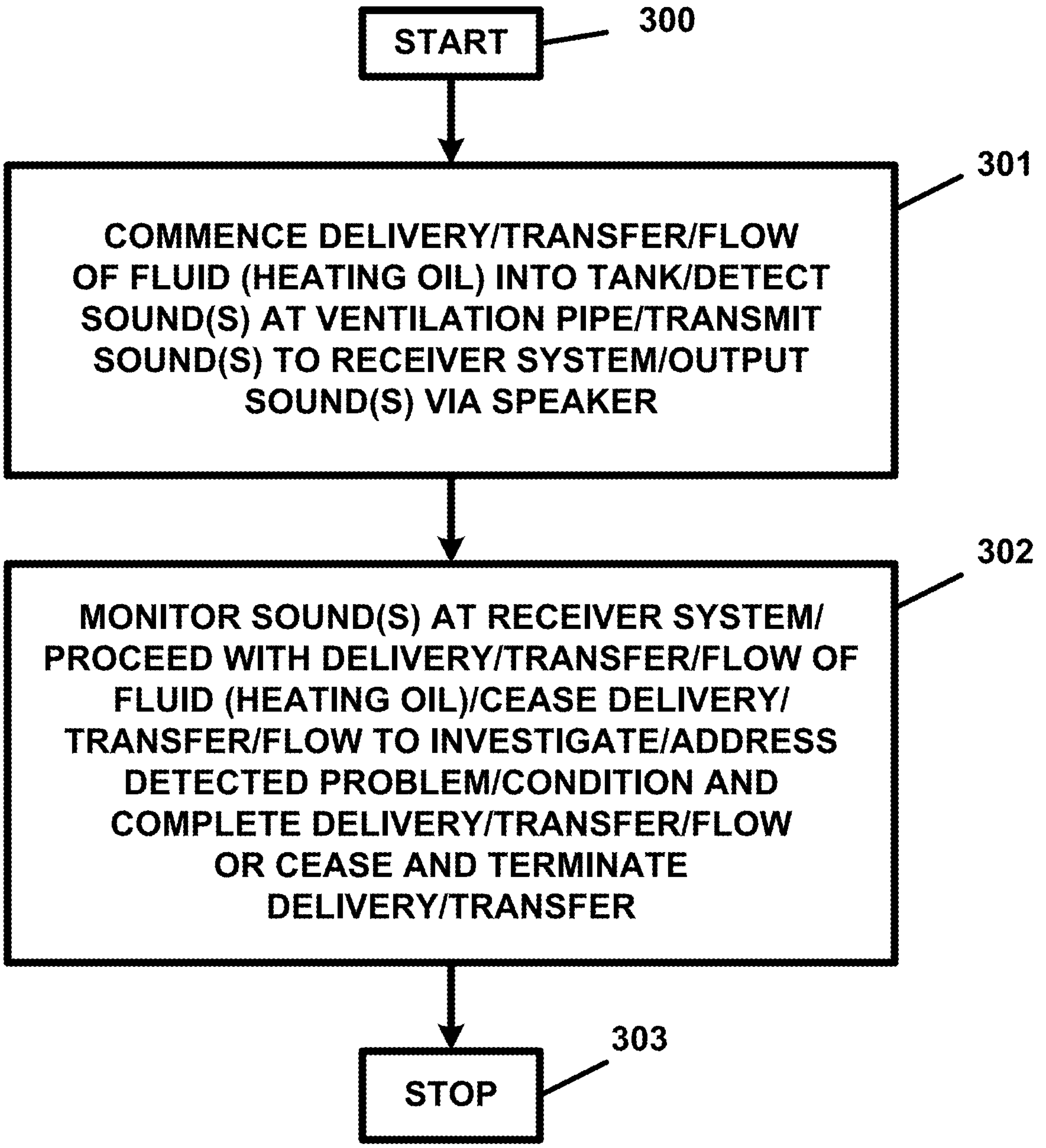
FIG. 3 illustrates a preferred embodiment method of utilizing the apparatus of FIG. 1, in flow diagram form.

FIG. 3 illustrates a preferred embodiment method for utilizing the apparatus 100 and method the present invention, in flow diagram form. With reference to FIG. 3, and with the components of the apparatus 100 situated and deployed as shown, and as described, in the preferred embodiment of FIG. 2, the method utilizing the apparatus 100 commences at step 300. At step 301, the flow of the heating oil from the nozzle 50 of the oil delivery vehicle 60 and into the fill pipe 82 of the heating oil tank 80 commences. At step 301, the microphone 11 of the monitor system 10 will detect the sound which emanates from the ventilation pipe 84 of the heating oil tank 80, and the transmitter 13 of the monitor system 10 will transmit a signal(s), which is/are indicative of the sound(s) emanating from the ventilation pipe 84, to the receiver 32 of the receiver system 30. At step 301, the speaker 34 of the receiver system 30 will provide an audible output of the sound(s) emanating from the ventilation pipe 84 during the delivery or transfer of the heating oil into the heating oil tank 80.

At and during step 301, at least three different kinds of sounds or sound conditions could emanate from the ventilation pipe. A first sound, which may be a hissing sound or a whistling sound, or other sound, indicative a flow of heating oil into the heating oil tank 80 can be detected by the microphone 11, transmitted from the transmitter 13, received by the receiver 32, and heard via the speaker 34, can indicate a safe and trouble-free delivery or transfer operation of and involving the heating oil.

A second sound, which may be a loud, a screeching, or an abrupt or violent, sound, indicative of an overfill condition, a clogged condition, or other problematic or trouble-some condition can also be detected by the microphone 11, transmitted from the transmitter 13, received by the receiver 32, and heard via the speaker 34, and can indicate an unsafe, problematic, or troublesome, condition, requiring the immediate cessation, or ceasing, or discontinuance, of the delivery or transfer operation of and regarding the heating oil.

A third sound, or a non-sound, may be the absence of any sound, which can indicate that either no heating oil is being delivered or transferred into the heating oil tank 80 or that no heating oil tank 80 is present, which might be the case if a removal of the heating oil tank 80 was unknown to, or never reported to, the oil delivery professional.

In another preferred embodiment of FIG. 3, at step 301, the display 37 of the receiver system 30 can display a digital or visual representation of the amplitude and/or any other nature or representation of the sound(s) which are detected by the microphone 11, transmitted from the transmitter 13, received by the receiver 32, and heard, or which should be heard, via the speaker 34. In this regard, a visual representation of the sound(s) detected by the microphone 11 can be provided to the oil delivery professional. At step 301, the respective green, or other suitable color, indicator light 38 can be illuminated so as to be indicative of a normal flow of the heating oil to and into the heating oil tank 80, and/or the respective red, or other suitable color, indicator light 38 can be illuminated so as to be indicative of an unsafe condition, a problem condition, an overfill condition, a clogged condition, or other problematic or trouble-some condition, and/or the absence of a heating oil tank 80 condition.

At step 302, and depending upon the sound or lack of sound detected by the microphone 11, transmitted from the transmitter 13, received by the receiver 32, and heard via the speaker 34, the oil delivery professional can either continue the safe and trouble-free delivery or transfer of the heating oil to and into the heating oil tank 80 or can shut down the flow of the heating oil at and from the nozzle 50 of the oil delivery vehicle 60. At step 302, if the sound detected by the microphone 11 and output via the speaker 34 indicates a normal delivery or transfer operation, then the oil delivery professional can proceed to complete the oil delivery or transfer operation, all the while monitoring the sound(s) emanating from the ventilation pipe 84.

If, however, at and during step 301 and/or step 302, and/or at and/or during the delivery or transfer operation, the oil delivery professional hears a sound(s), or sees a representation(s) of a sound(s) indicative of an unsafe condition, a problem condition, an overfill condition, a clogged condition, or other problematic or trouble-some condition, and/or the absence of a heating oil tank 80 condition, then the oil delivery professional can manually shut off the nozzle 50 so as to investigate the detected problem or condition. In another preferred embodiment, at step 302, the oil delivery professional can also enter an instruction into the receiver system 30, and/or can transmit a valve nozzle shut-off signal from the receiver system 30 to the emergency shut-off valve 40, which is being utilized in connection with, or which is associated with, or which is a component of, the nozzle 50, so as to shut off the flow of heating oil from the nozzle 50.

Thereafter, the oil delivery professional can complete the delivery or transfer of the fluid, material, or substance, if no problem is detected, or can investigate any detected problem with the delivery or transfer operation having been shut off or with the nozzle 50 having shut off, or can terminate the delivery or transfer operation. Thereafter, the operation of the apparatus will cease at step 303.

Although described herein as being utilized in order safely delivery fuel from a heating oil delivery vehicle 60 to a heating oil tank of a residential or commercial premises, the apparatus and method of the present invention can also be utilized in a same, a similar, and/or an analogous, manner in order to deliver or transfer any type or kind of fluid, material, or substance, from one storage tank or receptacle to another storage tank or receptacle in a safe, secure, and/or efficient manner.

As described herein, the apparatus 100 and method of the present invention provides a technological solution for, and provides a technological improvement to and for, delivery or transfer systems which are used in delivering or transferring fluids, materials, or substances, of any type or kind, from one storage tank or receptacle to another, by monitoring the sound or sounds which emanate from the ventilation pipe(s) of or corresponding to the storage tank or receptacle to or into which a respective fluid, material, or substance, is being delivered or transferred. As noted herein, although described and explained as being utilized in connection with the delivery or transfer of heating oil, the apparatus 100 and method of the present invention can be utilized in a same, a similar, and/or an analogous, manner in and for the transfer of any fluids, materials, or substances, whether in solid, liquid, or gaseous, form, and/or of any type, kind, or nature.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:

a monitor system, wherein the monitor system further comprises:
- a microphone;
- a first power supply, wherein the first power supply provides electrical power to the microphone or to the monitor system; and
- a transmitter, wherein the transmitter transmits a first audible sound, wherein the first audible sound is indicative of a normal flow of a fluid into a tank during a refilling operation, or wherein the transmitter transmits a second audible sound, wherein the second audible sound is indicative of a need to cease a flow of the fluid into the tank;

an attachment device, wherein the monitor system or the microphone is attached to the attachment device, and further wherein the attachment device is attached to a ventilation pipe associated with the tank, or wherein the attachment device is attached to an object in a vicinity of the ventilation pipe; and a receiver system, wherein the receiver system further comprises:

a receiver, wherein the receiver receives the first audible sound or the second audible sound;

a second power supply, wherein the second power supply provides electrical power to the receiver system; and a speaker, wherein the speaker provides a first audio output indicative of the first audible sound or provides a second audio output indicative of the second audible sound, wherein the speaker outputs the first audio output indicative of the normal flow of the fluid into the tank during the refilling operation, or wherein the speaker outputs the second audio output, indicative of the need to cease the flow of the fluid into the tank.

2. The apparatus of claim 1, wherein the receiver system further comprises:

a computer, wherein the computer controls an operation of the receiver system.

3. The apparatus of claim 1, wherein the receiver system further comprises:

an input device, wherein the input device inputs information or an instruction into the receiver system.

4. The apparatus of claim 1, wherein the receiver system further comprises:

a display, wherein the display displays a visual representation of the first audible sound, or wherein the display displays a visual representation of the second audible sound.

5. The apparatus of claim 1, wherein the receiver system further comprises:

at least two indicator lights, wherein a first indicator light of the at least two indicator lights indicates the normal flow of the fluid into the tank, and further wherein a second indicator light of the at least two indicator lights indicates a problem or unsafe condition regarding the flow of the fluid into the tank.

6. The apparatus of claim 1, wherein the receiver system further comprises:

a second transmitter, wherein the second transmitter transmits a control signal to close an emergency shut-off valve to stop the flow of the fluid into the tank.

7. The apparatus of claim 1, wherein the receiver system further comprises:

a second transmitter, wherein the second transmitter transmits a control signal to open an emergency shut-off valve to allow a flow of the fluid into the tank.

8. The apparatus of claim 1, wherein the attachment device is a magnet.

9. The apparatus of claim 1, wherein the attachment device is a strap, and further wherein the strap further comprises a hook and loop fastening element.

10. The apparatus of claim 1, wherein the receiver system is a headset.

11. The apparatus of claim 1, wherein the receiver system is an earpiece.

12. The apparatus of claim 1, wherein the receiver system is a wearable device.

13. The apparatus of claim 1, wherein the receiver system is a handheld device.

14. The apparatus of claim 13, wherein the handheld device is a cellular telephone.

15. An apparatus, comprising:

a monitor system, further comprising:

a microphone;

a first power supply; and a transmitter, wherein the transmitter transmits a first audible sound, wherein the first audible sound is indicative of a normal flow of a fluid or material into a tank during a refilling operation, or wherein the transmitter transmits a second audible sound, wherein the second audible sound is indicative of a need to cease a flow of the fluid or material into the tank;

an attachment device, wherein the monitor system or the microphone is attached to the attachment device, and further wherein the attachment device is attached to a ventilation pipe associated with the tank or is attached to an object in a vicinity of the ventilation pipe; and a receiver system, wherein the receiver system further comprises:

a receiver, wherein the receiver receives the first audible sound or the second audible sound;

a second power supply; and a speaker, wherein the speaker provides a first audio output, wherein the first audio output is indicative of the first audible sound, or wherein the speaker provides a second audio output, wherein the second audio output is indicative of the second audible sound, wherein the speaker outputs the first audio output to indicate the normal flow of the fluid or material into the tank during the refilling operation, or wherein the speaker outputs the second audio output indicative of the need to cease the flow of the fluid or material into the tank.

16. The apparatus of claim 15, wherein the fluid or material is heating oil.

17. The apparatus of claim 15, wherein the fluid or material is a liquid.

18. The apparatus of claim 15, wherein the fluid or material is a hazardous material or a hazardous substance.

19. The apparatus of claim 15, wherein the fluid or material is a solid substance.

20. An apparatus, comprising:

a monitor system, further comprising:

a microphone;

a first power supply; and a transmitter, wherein the transmitter transmits a first audible sound, wherein the first audible sound is indicative of a normal flow of a fluid or material into a tank during a refilling operation, or wherein the transmitter transmits a second audible sound, wherein the second audible sound is indicative of a need to cease a flow of the fluid or material into the tank;

an attachment device, wherein the monitor system or the microphone is attached to the attachment device, and further wherein the attachment device is attached to a ventilation pipe associated with the tank or is attached to an object in a vicinity of the ventilation pipe; and a receiver system, wherein the receiver system further comprises:

a receiver, wherein the receiver receives the first audible sound or receives the second audible sound;

a second power supply; and a speaker, wherein the speaker provides a first audio output, wherein the first audio output is indicative of the first audible sound, or wherein the speaker provides a second audio output, wherein the second audio output is indicative of the second audible sound; and a nozzle, wherein the nozzle dispenses the fluid or the material into the tank during the refilling operation, and further wherein the nozzle further comprises:

an emergency shut-off valve, wherein the emergency shut-off valve is electronically controllable via an electronic control unit, wherein the speaker outputs the first audio output, indicative of the normal flow of the fluid or material into the tank during the refilling operation, or wherein the speaker outputs the second audio output indicative of the need to cease the flow of the fluid or material into the tank, and further wherein a transmission of a first control signal to the emergency shut-off valve shuts off or closes the emergency shut-off valve and shuts-off a flow of the fluid or material from the nozzle.

* * * * *